United States Patent [19]
Prasad et al.

[11] 3,855,206
[45] Dec. 17, 1974

[54] ADENOSINE-5'-CARBOHYDROXAMIC ESTERS

[75] Inventors: Raj Nandan Prasad, Pierrefonds, Quebec, Canada; Herman Hal Stein, Skokie, Ill.

[73] Assignee: Abbott Laboratories, Chicago, Ill.

[22] Filed: Apr. 11, 1973

[21] Appl. No.: 350,233

[52] U.S. Cl. .......................... 260/211.5 R, 424/180
[51] Int. Cl. ............................................. C07d 51/54
[58] Field of Search ............................. 260/211.5 R

[56] References Cited
UNITED STATES PATENTS
3,697,504  10/1972  Schmidt ..................... 260/211.5 R
FOREIGN PATENTS OR APPLICATIONS
2,034,785  1/1972  Germany ..................... 260/211.5 R

*Primary Examiner*—Johnnie R. Brown
*Attorney, Agent, or Firm*—Robert L. Niblack; Joyce R. Krei; Vincent A. Mallare

[57] ABSTRACT

Adenosine-5'-carbohydroxamic esters represented by the formula

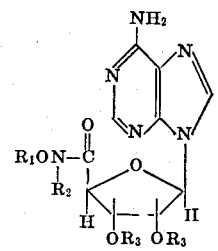

wherein $R_1$ and $R_2$ each are selected from the group consisting of hydrogen, loweralkyl, haloloweralkyl, hydroxyloweralkyl, lowercycloalkyl, loweralkylcycloalkyl, loweralkenyl, loweralkynyl, alkoxyalkyl or arylalkyl, with the limitation that when $R_1$ is hydrogen, $R_2$ cannot be hydrogen; $R_3$ is hydrogen, acyl or when taken together form an isopropylidene or benzylidene moiety, and the pharmaceutically acceptable acid addition salts thereof.

The compounds are useful in treating cardiovascular disorders and are particularly useful as anti-hyerrtensive and anti-anginal agents.

9 Claims, No Drawings

ADENOSINE-5'-CARBOHYDROXAMIC ESTERS

DETAILED DESCRIPTION OF THE INVENTION

The present invention relates to adenosine derivatives, to therapeutic compositions containing such adenosine derivatives as the active ingredients, and to methods of preparing and using the novel compounds, and to novel intermediates useful in the preparation of such compounds.

The compounds of this invention are represented by the formula

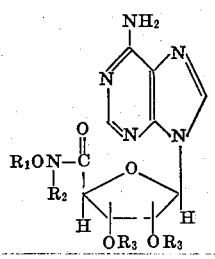

wherein $R_1$ and $R_2$ each are selected from the group consisting of hydrogen, loweralkyl, haloloweralkyl, hydroxyloweralkyl, lowercycloalkyl, loweralkylcycloalkyl, loweralkenyl, loweralkynyl, alkoxyalkyl or arylalkyl, with the limitation that when $R_1$ is hydrogen, $R_2$ cannot be hydrogen; $R_3$ is hydrogen, acyl or when taken together form an isopropylidene or benzylidene moiety; and the pharmaceutically acceptable acid addition salts thereof.

The term "loweralkyl" refers to both straight and branched chain $C_16$ alkyls including methyl, ethyl, n-propyl, iso-propyl, n-butyl, tert-butyl, iso-butyl, n-pentyl, iso-pentyl, neo-pentyl, hexyl and the like.

"Loweralkenyl" refers to the $C_2$–$C_5$ alkyl groups, as defined above, from which a hydrogen atom has been removed from each of two adjacent carbon atoms to produce ethylenic unsaturation; e.g., vinyl, allyl, methallyl, 1-pentenyl and the like.

"Loweralkynyl" refers to the $C_2$–$C_5$ alkyl groups as defined above, from which two hydrogen atoms have been removed from each of two adjacent carbon atoms to produce acetylenic unsaturation; e.g., ethynyl, propargyl, 2-butynyl, 1-pentynyl and the like.

"Halo" includes chloro, fluoro bromo or iodo.

"loweralkyl($C_3$–$C_6$)cycloalkyl" includes cyclopropylmethyl, cyclobutylethyl and the like.

The term "alkoxyloweralkyl" refers to alkoxyalkyl groups having no more than six carbon atoms, such as methoxymethyl, ethoxyethyl, methoxyethyl, propoxypropyl, propoxyethyl and the like.

The term "lowercycloalkyl" refers to $C_3$–$C_6$ cycloalkyl groups.

The term "pharmaceutically acceptable acid addition salts" refers to salts prepared by reacting the amide with an organic or inorganic acid. Representative salts include hydrochloride, hydrobromide, sulfate, bisulfate, acetate, valerate, oleate, laurate, borate, benzoate, lactate, phosphate, tosylate, citrate, maleate, succinate, tartrate, napsylate and the like.

Generally speaking, the compounds of this invention can conveniently be prepared by reacting an ester, such as the β-chloroethyl of adenosine-5'-carboxylic acid with the appropriate amine of the formula

to obtain the desired compound. The initial starting material, adenosine-5'-carboxylic acid can be prepared from 2',3'-isopropylidene adenosine according to the method described by Harmon et. al., Chem. Ind. 1969; 1141.

The β-chloroethyl ester can then be prepared by, for example, reacting adenosine-5'carboxylic acid with 2-chloroethanol in the presence of, for example, thionyl-chloride.

The compounds of this invention are useful as antihypertensive agents and anti-anginal agents. In the case of hypertension, the compounds are administered to hypertensive patients in dosages of from .001 to 10 mg./kg. of body weight daily, preferably in divided dosages; i.e., three to four times daily. In treating angina pectoris, the compounds are administered to patients suffering from, or prone to, angina attacks in dosages of from .01 to 30 mg./kg. of body weight daily. In both instances, it is preferred to administer the compounds orally; however, the compounds of this invention are also active when administered by parenteral routes of administration.

The following examples further illustrate this invention:

Example 1

Adenosine-5'-Carboxylic Acid, β-Chloroethyl Ester

Thionyl chloride (40 ml.) was added dropwise to a stirred suspension of adenosine-5'-carboxylic acid (42.0 g.) in 2-chloroethanol (500 ml.) at 0° C. After 1 hour at 0° C., the reaction mixture was stirred at room temperature overnight and then poured on to cold ether and filtered. The nearly dry solid was stirred with cold saturated sodium-bicarbonate solution until slightly basic. The insoluble material was filtered, washed successively with an excess of cold water, acetone and ether and dried in vacuum for 2 days to 36.5 g. (73 percent) of adenosine-5'-carboxylic acid, β-chloroethyl ester; m.p. 197°–200°dec. This material had the characteristic infrared and nmr absorption spectra. This was pure enough for subsequent reactions.

Example 2

Adenosine-5'-Carbohydroxamic Acid, Methyl Ester

2',3'-O-Isopropylidene adenosine-5'-carboxylic acid (5.0 g.; 0.0156 mole) was added portionwise to thionylchloride (40 ml.) at 0° C. After stirring for two hours at room temperature, the clear solution was poured onto a large volume of well-stirred ether. The precipitated material (acid chloride) was filtered, washed thoroughly with ether and used immediately in the following experiment:

Triethyl amine (40 ml.) was added dropwise to a mixture of methoxyamine hydrochloride (14.0 g; 0.167 mole) in chloroform (150 ml.) at 5°C. The above prepared 2',3'-O-isopropylidene adenosine-5'-carboxylic acid chloride was added to this stirred reaction mixture at 5° C. After the addition was complete, the mixture was stirred at the room temperature for 70 hours and evaporated under reduced pressure. The residue was washed with ether and then stirred with aqueous sodium bicarbonate solution and filtered to give 3.6 g. of undissolved solid. Recrystallization from absolute ethanol gave pure 2′,3′-O-isopropylidene adenosine-5′-carbohydroxamic acid, methyl ester, melting at 229°–30° dec., having the characteristic infrared absorptions at 1,680(w) cm$^{-1}$ and 1,650(s) cm$^{-1}$.

Analysis Calcd. for $C_{14}H_{18}N_6O_5$: C, 48.00; H, 5.18; N, 23.99
Found: C, 48.15; H, 5.27; N, 24.26

The structure was confirmed by nmr spectra.

A solution of 2′,3′-O-isopropylidene adensoine-5′-carbohydroxamic acid, methyl ester (1.2 g.) in 50 percent formic acid (20 ml.) was heated at 60°–70°. Thin layer chromatography (TLC) indicated that the cleavage of the isopropylidene group was complete in 2.5 hours. The reaction mixture was evaporated to dryness under reduced pressure, diluted with water and the process of evaporation and dilution with water continued several times to give 0.87 g. of colorless solid. This product was successively washed with cold aqueous sodium bicarbonate solution, water, and then recrystallized from water to give 0.7 g. of adenosine-5′-carbohydroxamic acid, methyl ester. monohydrate; (m.p., softening above 95°, melting at 113° dec.).

Analysis Calcd. for $C_{11}H_{14}N_6O_5 \cdot H_2O$: C, 40.24; H, 4.91
N, 25.60
Found: C, 40.50; H, 4.95; N, 25.60

Nmr spectra confirmed the structure.

EXAMPLE 3

Adenosine-5′-Carbohydroxamic Acid, Ethyl Ester, Dihydrate

2′,3′-O-Isopropylidene adenosine-5′-carboxylic acid chloride [prepared from 8.0 g. (0.025 mole) of 2′,3′-O-isopropylidene 5′-carboxylic acid, as described before] was added to a clear solution of ethoxyamine hydrochloride (4.9 g.; 0.05 mole) in chloroform (100 ml.) containing triethylamine (20 ml.) at 5° C. The mixture was stirred 15 hours) at room temperature, filtered and evaporated under reduced pressure. The residue was redissolved in chloroform, diluted with ether, and the precipitate (16.5 g.) was triturated with cold aqueous sodium bicarbonate solution. The insoluble residue was washed with ice-water, ether and recrystallized with absolute ethanol to give 2.2 g. (23 percent) of 2′,3′-O-isopropylidene adenosine-5′-carbohydroxamic acid, ethyl ester as a monohydrate.

Analysis Calcd. for $C_{15}H_{20}N_6O_5 \cdot H_2O$: C, 47.12; H, 5.80:
N, 21.98
Found: C, 47.21: H, 5.29; N, 22.07

A solution of 2′,3′-O-isopropylidene-adenosine-5′-carbohydroxamic acid, ethyl ester, monohydrate (2.0 g.) in 50 percent formic acid was kept at 70° for 80 minutes. The solution was evaporated under reduced pressure, diluted with water and evaporated again. This process of dilution with water and evaporation under reduced pressure was repeated a few times. Finally, the residue was recrystallized from water to give 1.5 g. of solid. The solid was stirred with ice-cold aqueous sodium bicarbonate solution, filtered and recrystallized again from water to give 1.3 g. of adenosine-5′-carbohydroxamic acid, ethyl ester, as a dihydrate, m.p. 117°–120° (dec.).

Analysis Calcd. for $C_{12}H_{16}N_6O_5 \cdot 2H_2O$: C, 23.32; O, 31.08
Found: C, 22.70; O, 30.65

Nmr spectra confirmed the structure of the compound,

Example 4

Adenosine-5′-Carbohydroxamic Acid, Benzyl Ester Monohydrate

A suspension of adenosine-5′-carboxylic acid, β-chloroethyl ester (3.43 g.; 0.01 mole; prepared as described before) in benzyloxyamine (22 ml.) was kept at 130° for 2.5 hours. The cloudy solution was filtered hot into a large volume of ether. The precipitate was triturated, washed with ether and recrystallized twice from absolute ethanol to give adenosine-5′-carbohydroxamic acid, benzyl ester monohydrate, m.p. 130°–140°.

Analysis Calcd. for $C_{17}H_{18}N_6O_5 \cdot H_2O$: C, 50.50; H, 5.00;
O, 23.70
Found: C, 51.13; H, 5.52; O, 23.11

The compound had the characteristic infrared and nmr spectra; $R_f$: 0.42. (isopropanol:water:ammonium hydroxide = 7:2:1).

The compounds of this invention can be formulated into various pharmaceutical dosage forms such as tablets, capsules, pills and the like, for immediate or sustained release, by combining the active compound with suitable pharmaceutically acceptable carriers or diluents according to methods well known in the art. Such dosage forms may additionally include excipients, binders, fillers, flavoring and sweetening agents and other therapeutically inert ingredients necessary in the formulation of the desired pharmaceutical preparation.

The following example further illustrates the pharmaceutical compositions which are a feature of this invention:

EXAMPLE 5

Tablets weighing 200 mg. and having the following composition are prepared by standard tableting procedures:

| Ingredient | Mg. |
|---|---|
| Adenosine-5′-carbohydroxamic acid, ethyl ester | 100 |
| Starch | 94 |
| Colloidal silica | 5 |
| Magnesium stearate | 1 |

It will be understood by those skilled in the art that the above composition can contain any of the compounds of this invention.

We claim:
1. A compound of the formula

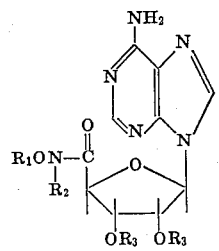

wherein $R_1$ and $R_2$ each are selected from the group consisting of hydrogen, loweralkyl, haloloweralkyl, hydroxyloweralkyl, loweralkylcycloalkyl, loweralkylcycloalkyl, loweralkenyl, loweralkynyl, an alkoxy loweralkyl having from one to six carbon atoms or a lowercycloalkyl having from three to six carbon atoms, with the limitation that when $R_1$ is hydrogen, $R_2$ cannot be hydrogen; wherein each $R_3$ is hydrogen or when taken together form an isopropylidene or benzylidene moiety, and the pharmaceutically acceptable acid addition salts thereof.

2. A compound in accordance with claim 1 wherein $R_1$ is loweralkyl and $R_2$ is hydrogen.

3. A compound in accordance with claim 2 wherein each $R_3$ is hydrogen.

4. A compound selected from the group consisting of adenosine-5'-carbohydroxamic acid, methyl ester or a pharmaceutically acceptable acid addition salt thereof, said compound having the formula

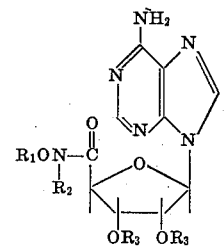

wherein $R_1$ is loweralkyl, $R_2$ is hydrogen and wherein each $R_3$ is hydrogen or when taken together form an isopropylidene or benzylidene moiety or the pharmaceutically acceptable acid addition salts thereof.

5. A compound selected from the group consisting of adenosine-5'-carbohydroxamic acid, ethyl ester or a pharmaceutically acceptable acid addition salt thereof, said compound having the formula

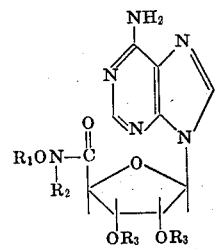

wherein $R_1$ is alkyl, $R_2$ is hydrogen and each $R_3$ is hydrogen.

6. A compound in accordance with claim 1 wherein $R_1$ is a lowercycloalkyl of from three to six carbon atoms and $R_2$ is hydrogen.

7. A compound selected from the group consisting of adenosine-5'-carbohydroxamic acid, benzyl ester or a pharmaceutically acceptable acid addition salt thereof, said compound having the formula

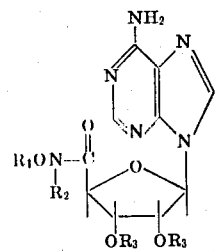

wherein $R_1$ is a lowercycloalkyl with from three to six carbon atoms, $R_2$ is hydrogen and each $R_3$ is hydrogen.

8. A compound in accordance with claim 1 wherein both are $R_3$'s are taken together to form an isopropylidene moiety.

9. A compound in accordance with claim 1 wherein both $R_3$'s are taken together to form an isopropylidene moiety.

* * * * *

UNITED STATES PATENT AND TRADEMARK OFFICE
CERTIFICATE OF CORRECTION

PATENT NO. : 3,855,206
DATED : December 17, 1974
INVENTOR(S) : Raj Nandan Prasad and Herman Hal Stein It is certified that error appears in the above-identified patent and that said Letters Patent are hereby corrected as shown below:

Column 6, Claim 9, after the word "an", delete the word "isopropylidene" and substitute therefor the word --benzylidene--

Signed and Sealed this twenty-fifth Day of November 1975

[SEAL]

Attest:

RUTH C. MASON
Attesting Officer

C. MARSHALL DANN
Commissioner of Patents and Trademarks